United States Patent
Bushey et al.

(10) Patent No.: US 8,131,524 B2
(45) Date of Patent: *Mar. 6, 2012

(54) METHOD AND SYSTEM FOR AUTOMATING THE CREATION OF CUSTOMER-CENTRIC INTERFACES

(75) Inventors: Robert R. Bushey, Cedar Park, TX (US); Theodore B. Pasquale, Austin, TX (US); Scott H. Mills, Austin, TX (US); John M. Martin, Austin, TX (US); Benjamin A. Knott, Round Rock, TX (US); Kurt M. Joseph, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/127,403

(22) Filed: May 27, 2008

(65) Prior Publication Data
US 2008/0313571 A1 Dec. 18, 2008

Related U.S. Application Data

(63) Continuation of application No. 10/217,873, filed on Aug. 13, 2002, now Pat. No. 7,379,537, which is a continuation-in-part of application No. 09/532,038, filed on Mar. 21, 2000, now Pat. No. 6,778,643.

(51) Int. Cl.
*G06G 7/48* (2006.01)
(52) U.S. Cl. ........ 703/6; 715/700; 715/734; 704/4; 704/246; 379/88.18

(58) Field of Classification Search .......... 379/88.18; 715/700, 704, 716, 727, 745, 734; 703/6; 704/4, 246
See application file for complete search history.

(56) References Cited

U.S. PATENT DOCUMENTS

| | | | |
|---|---|---|---|
| 4,310,727 | A | 1/1982 | Lawser |
| 4,694,483 | A | 9/1987 | Cheung |
| 4,761,542 | A | 8/1988 | Kubo et al. |
| 4,922,519 | A | 5/1990 | Daudelin |
| 4,930,077 | A | 5/1990 | Fan |
| 4,964,077 | A | 10/1990 | Eisen et al. |

(Continued)

FOREIGN PATENT DOCUMENTS

WO 00/33548 6/2000

(Continued)

OTHER PUBLICATIONS

Kelly, "From Intelligent Call Routing to Intelligent Contact Management", Call Center Solutions, vol. 19, No. 3, 4 pages, (Sep. 2000).

(Continued)

*Primary Examiner* — Kamini S Shah
*Assistant Examiner* — Kibrom Gebresilassie
(74) *Attorney, Agent, or Firm* — Greenblum & Bernstein, P.L.C.

(57) ABSTRACT

An interface is provided by creating prompts for the interface. The prompts represent tasks to be accomplished by a user and are obtained based on user input. The prompts are grouped according to relationships, obtained from the user input, among the tasks. The interface is updated based on user feedback. Each of the prompts is designated using user terminology obtained from the user input.

20 Claims, 5 Drawing Sheets

U.S. PATENT DOCUMENTS

| | | |
|---|---|---|
| 5,115,501 A | 5/1992 | Kerr |
| 5,181,259 A | 1/1993 | Rorvig |
| 5,204,968 A | 4/1993 | Parthasarathi |
| 5,206,903 A | 4/1993 | Kohler et al. |
| 5,263,167 A | 11/1993 | Conner, Jr. et al. |
| 5,299,260 A | 3/1994 | Shaio |
| 5,311,422 A | 5/1994 | Loftin et al. |
| 5,323,452 A | 6/1994 | Dickman et al. |
| 5,327,529 A | 7/1994 | Fults et al. |
| 5,335,268 A | 8/1994 | Kelly, Jr. et al. |
| 5,335,269 A | 8/1994 | Steinlicht |
| 5,371,673 A | 12/1994 | Fan |
| 5,388,198 A | 2/1995 | Layman et al. |
| 5,420,975 A | 5/1995 | Blades et al. |
| 5,479,488 A | 12/1995 | Lenning et al. |
| 5,495,567 A | 2/1996 | Iizawa et al. |
| 5,500,795 A | 3/1996 | Powers et al. |
| 5,519,772 A | 5/1996 | Akman et al. |
| 5,530,744 A | 6/1996 | Charalambous et al. |
| 5,533,107 A | 7/1996 | Irwin et al. |
| 5,535,321 A | 7/1996 | Massaro et al. |
| 5,537,470 A | 7/1996 | Lee |
| 5,553,119 A | 9/1996 | McAllister et al. |
| 5,561,711 A | 10/1996 | Muller |
| 5,566,291 A | 10/1996 | Boulton et al. |
| 5,586,060 A | 12/1996 | Kuno et al. |
| 5,586,171 A | 12/1996 | McAllister et al. |
| 5,586,219 A | 12/1996 | Yufik |
| 5,594,791 A | 1/1997 | Szlam et al. |
| 5,600,781 A | 2/1997 | Root et al. |
| 5,615,323 A | 3/1997 | Engel et al. |
| 5,633,909 A | 5/1997 | Fitch |
| 5,657,383 A | 8/1997 | Gerber et al. |
| 5,659,724 A | 8/1997 | Borgida et al. |
| 5,666,400 A | 9/1997 | McAllister et al. |
| 5,668,856 A | 9/1997 | Nishimatsu et al. |
| 5,671,351 A | 9/1997 | Wild et al. |
| 5,675,707 A | 10/1997 | Gorin et al. |
| 5,684,870 A | 11/1997 | Maloney et al. |
| 5,684,872 A | 11/1997 | Flockhart et al. |
| 5,706,334 A | 1/1998 | Balk et al. |
| 5,710,884 A | 1/1998 | Dedrick et al. |
| 5,727,950 A | 3/1998 | Cook et al. |
| 5,729,600 A | 3/1998 | Blaha et al. |
| 5,734,709 A | 3/1998 | DeWitt et al. |
| 5,740,549 A | 4/1998 | Reilly et al. |
| 5,757,644 A | 5/1998 | Jorgensen et al. |
| 5,758,257 A | 5/1998 | Herz et al. |
| 5,771,276 A | 6/1998 | Wolf |
| 5,790,117 A | 8/1998 | Halviatti et al. |
| 5,793,368 A | 8/1998 | Beer |
| 5,802,526 A | 9/1998 | Fawcett et al. |
| 5,806,060 A | 9/1998 | Borgida et al. |
| 5,808,908 A | 9/1998 | Ghahramani |
| 5,809,282 A | 9/1998 | Cooper et al. |
| 5,812,975 A | 9/1998 | Komori et al. |
| 5,819,221 A | 10/1998 | Kondo et al. |
| 5,821,936 A | 10/1998 | Shaffer et al. |
| 5,822,397 A | 10/1998 | Newman |
| 5,822,744 A | 10/1998 | Kesel |
| 5,825,856 A | 10/1998 | Porter et al. |
| 5,825,869 A | 10/1998 | Brooks et al. |
| 5,832,428 A | 11/1998 | Chow et al. |
| 5,832,430 A | 11/1998 | Lleida et al. |
| 5,835,565 A | 11/1998 | Smith et al. |
| 5,848,396 A | 12/1998 | Gerace |
| 5,864,605 A * | 1/1999 | Keshav ........................ 379/88.01 |
| 5,864,844 A | 1/1999 | James et al. |
| 5,870,308 A | 2/1999 | Dangelo et al. |
| 5,872,865 A | 2/1999 | Normile et al. |
| 5,873,068 A | 2/1999 | Beaumont et al. |
| 5,884,029 A | 3/1999 | Brush, II et al. |
| 5,899,992 A | 5/1999 | Iyer et al. |
| 5,903,641 A | 5/1999 | Tonisson |
| 5,905,774 A | 5/1999 | Tatchell et al. |
| 5,920,477 A | 7/1999 | Hoffberg et al. |
| 5,923,745 A | 7/1999 | Hurd |
| 5,943,416 A | 8/1999 | Gisby |
| 5,953,406 A | 9/1999 | LaRue et al. |
| 5,963,965 A | 10/1999 | Vogel |
| 5,974,253 A | 10/1999 | Nahaboo et al. |
| 5,991,735 A | 11/1999 | Gerace |
| 5,999,611 A | 12/1999 | Tatchell et al. |
| 5,999,908 A | 12/1999 | Abelow |
| 6,014,638 A | 1/2000 | Burge et al. |
| 6,016,336 A | 1/2000 | Hanson |
| 6,026,381 A | 2/2000 | Barton, III et al. |
| 6,032,129 A | 2/2000 | Greef et al. |
| 6,035,283 A | 3/2000 | Rofrano |
| 6,035,336 A | 3/2000 | Lu et al. |
| 6,038,560 A | 3/2000 | Wical |
| 6,044,355 A | 3/2000 | Crockett et al. |
| 6,052,693 A | 4/2000 | Smith et al. |
| 6,055,542 A * | 4/2000 | Nielsen et al. ............. 707/104.1 |
| 6,058,163 A | 5/2000 | Pattison et al. |
| 6,058,179 A | 5/2000 | Shaffer et al. |
| 6,058,435 A | 5/2000 | Sassin et al. |
| 6,061,433 A | 5/2000 | Polcyn et al. |
| 6,067,538 A | 5/2000 | Zorba et al. |
| 6,088,429 A * | 7/2000 | Garcia ........................ 379/88.22 |
| 6,099,320 A | 8/2000 | Papadopoulos |
| 6,104,790 A | 8/2000 | Narayanaswami |
| 6,118,447 A * | 9/2000 | Harel ............................. 717/131 |
| 6,128,380 A | 10/2000 | Shaffer et al. |
| 6,134,315 A | 10/2000 | Galvin |
| 6,134,530 A | 10/2000 | Bunting et al. |
| 6,148,063 A | 11/2000 | Brennan et al. |
| 6,157,808 A | 12/2000 | Hollingsworth |
| 6,160,877 A | 12/2000 | Tatchell et al. |
| 6,161,130 A | 12/2000 | Horvitz et al. |
| 6,163,607 A | 12/2000 | Bogart et al. |
| 6,166,732 A | 12/2000 | Mitchell et al. |
| 6,170,011 B1 | 1/2001 | MacLeod Beck et al. |
| 6,173,053 B1 | 1/2001 | Bogart et al. |
| 6,173,279 B1 | 1/2001 | Levin et al. |
| 6,178,404 B1 * | 1/2001 | Hambleton et al. ........... 704/275 |
| 6,201,948 B1 | 3/2001 | Cook et al. |
| 6,212,502 B1 | 4/2001 | Ball et al. |
| 6,219,665 B1 | 4/2001 | Shiomi |
| 6,230,197 B1 | 5/2001 | Beck et al. |
| 6,236,955 B1 | 5/2001 | Summers |
| 6,236,990 B1 * | 5/2001 | Geller et al. ...................... 707/5 |
| 6,243,375 B1 | 6/2001 | Speicher |
| 6,249,579 B1 | 6/2001 | Bushnell |
| 6,263,052 B1 | 7/2001 | Cruze |
| 6,269,153 B1 | 7/2001 | Carpenter et al. |
| 6,278,976 B1 | 8/2001 | Kochian |
| 6,282,404 B1 | 8/2001 | Linton |
| 6,289,084 B1 | 9/2001 | Bushnell |
| 6,292,909 B1 | 9/2001 | Hare |
| 6,295,551 B1 | 9/2001 | Roberts et al. |
| 6,296,376 B1 | 10/2001 | Kondo et al. |
| 6,308,172 B1 | 10/2001 | Agrawal et al. |
| 6,314,402 B1 * | 11/2001 | Monaco et al. ................ 704/275 |
| 6,330,326 B1 | 12/2001 | Whitt |
| 6,332,154 B2 | 12/2001 | Beck et al. |
| 6,336,109 B2 | 1/2002 | Howard |
| 6,349,290 B1 | 2/2002 | Horowitz |
| 6,353,661 B1 | 3/2002 | Bailey, III |
| 6,353,825 B1 | 3/2002 | Ponte |
| 6,357,017 B1 | 3/2002 | Bereiter et al. |
| 6,366,879 B1 | 4/2002 | Coxhead et al. |
| 6,374,260 B1 | 4/2002 | Hoffert et al. |
| 6,381,640 B1 | 4/2002 | Beck et al. |
| 6,389,400 B1 | 5/2002 | Bushey et al. |
| 6,389,403 B1 | 5/2002 | Dorak, Jr. et al. |
| 6,389,538 B1 | 5/2002 | Gruse et al. |
| 6,400,807 B1 | 6/2002 | Hewitt et al. |
| 6,405,149 B1 | 6/2002 | Tsai et al. |
| 6,405,159 B2 | 6/2002 | Bushey et al. |
| 6,405,170 B1 | 6/2002 | Phillips et al. |
| 6,411,687 B1 * | 6/2002 | Bohacek et al. ............. 379/88.21 |
| 6,448,980 B1 | 9/2002 | Kumar et al. |
| 6,460,057 B1 * | 10/2002 | Butler et al. ................... 715/204 |
| 6,483,523 B1 | 11/2002 | Feng |
| 6,487,277 B2 * | 11/2002 | Beyda et al. ................. 379/88.01 |
| 6,516,051 B2 | 2/2003 | Sanders |

| | | | |
|---|---|---|---|
| 6,564,197 B2 | 5/2003 | Sahami et al. | |
| 6,598,022 B2 | 7/2003 | Yuschik | |
| 6,601,029 B1* | 7/2003 | Pickering | 704/257 |
| 6,618,715 B1 | 9/2003 | Johnson et al. | |
| 6,694,482 B1 | 2/2004 | Arellano et al. | |
| 6,741,967 B1 | 5/2004 | Wu et al. | |
| 6,778,643 B1 | 8/2004 | Bushey et al. | |
| 6,885,733 B2 | 4/2005 | Pearson et al. | |
| 6,912,272 B2 | 6/2005 | Kirk et al. | |
| 6,914,975 B2 | 7/2005 | Koehler et al. | |
| 6,920,425 B1* | 7/2005 | Will et al. | 704/275 |
| 6,944,592 B1* | 9/2005 | Pickering | 704/251 |
| 6,964,012 B1 | 11/2005 | Zirngibl et al. | |
| 6,965,925 B1 | 11/2005 | Shank et al. | |
| 7,043,004 B1 | 5/2006 | Khuc et al. | |
| 7,065,188 B1 | 6/2006 | Mei et al. | |
| 7,086,007 B1 | 8/2006 | Bushey et al. | |
| 7,092,888 B1 | 8/2006 | McCathy et al. | |
| 7,317,789 B2* | 1/2008 | Comerford | 379/88.18 |
| 7,457,395 B2* | 11/2008 | Creamer et al. | 379/88.01 |
| 2001/0011211 A1 | 8/2001 | Bushey et al. | |
| 2001/0014146 A1* | 8/2001 | Beyda et al. | 379/88.25 |
| 2001/0014863 A1 | 8/2001 | Williams, III | |
| 2001/0041562 A1 | 11/2001 | Elsey et al. | |
| 2002/0055868 A1 | 5/2002 | Dusevic et al. | |
| 2002/0073360 A1 | 6/2002 | Lewis et al. | |
| 2002/0095328 A1 | 7/2002 | Swart et al. | |
| 2002/0133394 A1 | 9/2002 | Bushey et al. | |
| 2003/0026409 A1 | 2/2003 | Bushey et al. | |
| 2003/0055974 A1 | 3/2003 | Brophy et al. | |
| 2003/0143981 A1 | 7/2003 | Kortum et al. | |
| 2003/0144841 A1* | 7/2003 | Shao | 704/251 |
| 2003/0156133 A1 | 8/2003 | Martin et al. | |
| 2003/0156706 A1 | 8/2003 | Koehler et al. | |
| 2003/0158655 A1* | 8/2003 | Obradovich et al. | 701/207 |
| 2003/0161449 A1 | 8/2003 | Plan | |
| 2003/0161464 A1* | 8/2003 | Rodriguez et al. | 379/266.01 |
| 2004/0044950 A1* | 3/2004 | Mills et al. | 715/500 |
| 2004/0085162 A1* | 5/2004 | Agarwal et al. | 333/196 |
| 2004/0153322 A1* | 8/2004 | Neuberger et al. | 704/270.1 |
| 2004/0179659 A1* | 9/2004 | Byrne et al. | 379/88.18 |
| 2004/0240635 A1 | 12/2004 | Bushey et al. | |
| 2004/0264652 A1 | 12/2004 | Erhart et al. | |
| 2006/0026049 A1 | 2/2006 | Joseph et al. | |
| 2008/0036869 A1* | 2/2008 | Gustafsson et al. | 348/222.1 |

FOREIGN PATENT DOCUMENTS

WO 00/73968 12/2000

OTHER PUBLICATIONS

"Call Center Roundup", Teleconnect, 10 pages, (Dec. 1998).
"Call Centers: Sales, service and Competitive Advantage,"Canadian Business, vol. 70, No. 2, 8 pages, (Feb. 1997).
Foster, "Advanced Definity Call Centers: Working for You and Your Customers,"AT&T Technology, vol. 9, No. 2, 7 pages, (Summer 1994).
Card, S.K., et al., The Psychology of Human-Computer Interaction, Hillsdale, NJ: Lawrence Erlbaum, (1983).
Hart et al. "Development of the NASA-TLX (Task Load Index): Results of Empirical and Theoretical Research". In P.A. Hancock and N. Meshkati (Eds.), Human Mental Workload. (pp. 139-183) Amsterdam: North-Holland, (1988).
John et al. "using GOMS for User Interface Design and Evaluation: Which technique?", ACM Transactions on Computer-Human Interaction, 3 (4). 287-319, (1996).
Shingledecker, "Operator Strategy: A Neglected Variable in Workload Assessment", The American Psychological Association, Division 21 Symposium on "Mental Workload Measurement: The Theory Application Interface."Montreal, Quebec, Canada: American Psychological Association (1980).
Wei "Mental Load and Performance at Different Automation Level." The Netherlands: Delft University. Applicants particularly call the Examiner's attention to pp. 28-38, (1997).
Wirwille et al. "Recommendations for Mental Workload Measurement in a Test and Evaluation Environment." Human Factors, 35 (2), 263-281, (1993).

American Corp., "Ameritech Phone-Based UI Standards: Dialogue Design", downloaded from ameritech.com/corporate/testtown/library/standard/pbix4.html, (1998).
Inter VoiceBrite, Inc., "AgentConnect Call Center Platform Brochure," no date available.
ACD Learning Center Tutorial series, ACD Call Center Online Learning Center, call-center.net/ivr-series.htm.
"Customer Management Technology", TeleTech, downloaded from teletech.com/solutions/cmt.htm>, (Dec. 2001).
"Products & Services—Interactive Voice Response (IVR)", Prairie Systems, downloaded from prairiesys.com/PSI/p_s interactive_sol.htm.
"RVS Voice", IMessageing Systems, Inc., downloaded from imessagingsystems.com/improds/rvsvoice/rvsvoice/rvsvoice.htm.
"What's Next in Interactive Voice Response,"International Nortel Networks Meridian Users Group, downloaded from innmug.org/information/kirvan.html, InnTouch, (Dec. 2000).
Kobayashi, "Information Presentation based on Individual User Interests,"Second International Conference, IEEE, pp. 375-383, (Apr. 1998).
Sgouros, "Dynamic Dramatization of Multimedia Story Presentations", ACM, pp. 87-94, (1997).
Murtaugh, "The Automatist Storytelling System," Massachusetts Institute of Technology, Masters Thesis, (1996).
Brooks, "Do Story Agents Use Rocking Chars: The Theory and Implementation of One Model for Computational Narrative,"Proceedings of the forth ACM International Multimedia conference on Intelligent User Interfaces, ACM Press (1996).
Szekely, "Retrospective and Challenges for Model-Based Interface development,"USC Information Science Institute, (1996).
Maybury, "Automating the Generation of Coordinated Multimedia Explanations," Intelligent Multi-Media Interfaces, AAAI/MIT Press, Cambridge, MA, 1993, Chapter 5: Fiener et al. (1993).
Stanfield et al., "Toward Memory-Based Reasoning", Communications of the ACM, vol. 29, No. 12, ACM Press, (Dec. 1986).
Orwant, "Doppelganger Goes to School: Machine Learning for User Modeling", MIT MS Thesis, (Sep. 1993).
Orwant, "For want of a bit the user was lost: Cheap user modeling", IBM Systems Journal, vol. 35, Nos. 3 & 4, pp. 398-416, (1996).
Shardanard, "Social Information Filtering for Music Recommendation," MIT MS Thesis, (Sep. 1994).
Maes, "From Animals to Animals 2: Proceedings of the Second International Conference on Simulation of Adaptive Behavior, Behavior based Artificial Intelligence," MIT Media Laboratory (1992).
Kellner et al., "PADIS—An Automatic Telephone Switchboard and Directory information System," Speech Communication, (Oct. 1997).
Carpenter et al., "Natural Language Call Routing : a Robust, Self-Organizing Approach," Lucent Technologies Bell Laboratories, (1998).
Press release, "Lucent Technologies Announces Trial of Natural Language Call Routing Technology" (Dec. 1997).
Riccardi et al., "A spoken Language system for Automated Call Routing," 1997 IEEE International Conference on Acoustics, Speech, and Signal.
U.S. Appl. No. 09/578,904 to Bushey et al.
U.S. Appl. No. 09/578,723 to Bushey et al.
Lieberman, H., et al., "Let's Browse: A Collaborative Web Browsing Agent" (Jan. 1999).
U.S. Appl. No. 10/188,152, filed Jul. 2, 2002 by Mills et al. and entitled "Method and System for Automated Categorization of Statements".
U.S. Appl. No. 10/230,708, filed Aug. 29, 2002 by Knott et al. and entitled Method, System and Apparatus for Providing an Adaptive Persona in Speech-based Interactive Voice Response Systems.
U.S. Appl. No. 10/217,863, filed Aug. 13, 2002 by Mills et al. and "System and Method for the Automated Analysis of Performance Data".
Chu-Carroll et al., "Vector-based Natural Language Call Routing", Association for Computational Linguistics, pp. 361-388. (1999).

* cited by examiner

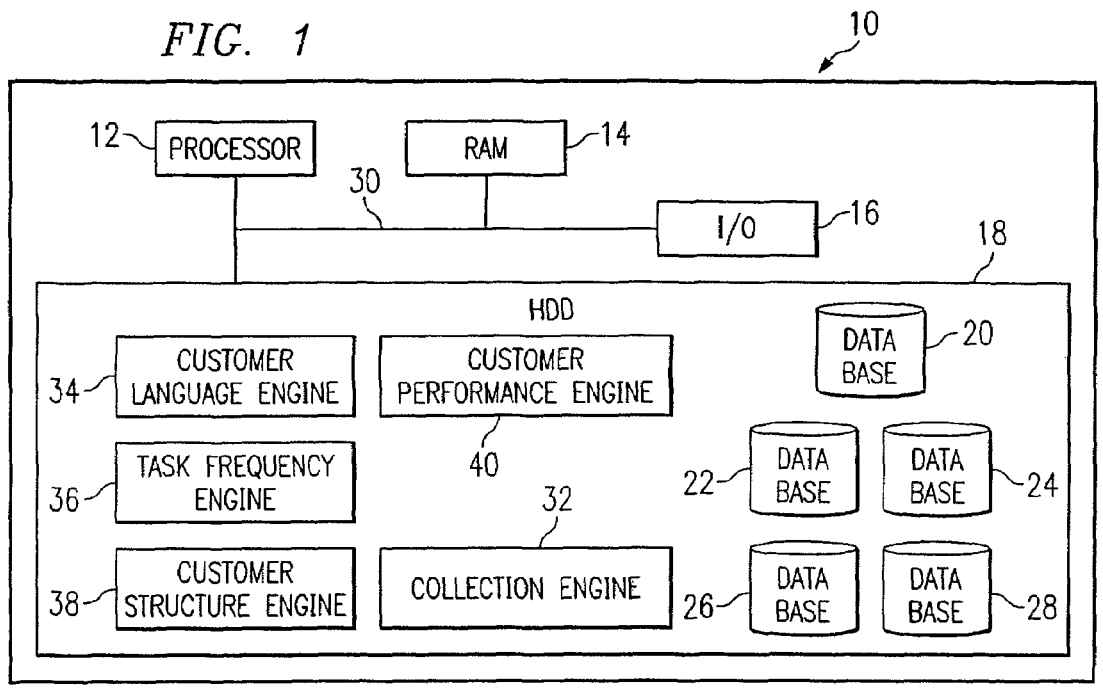

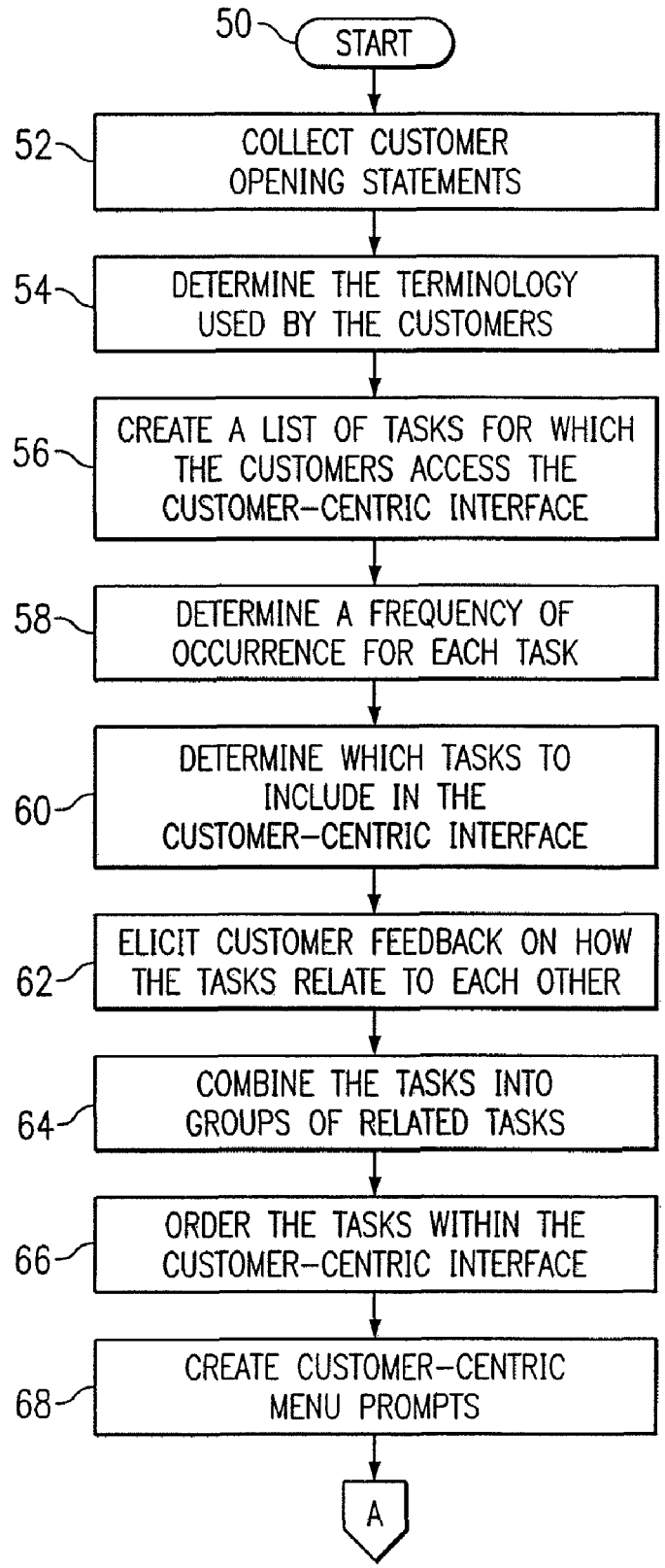

METHOD AND SYSTEM FOR AUTOMATING THE CREATION OF CUSTOMER-CENTRIC INTERFACES

RELATED PATENT APPLICATION

This application is a continuation of U.S. patent application Ser. No. 10/217,873, filed Aug. 13, 2002, now U.S. Pat. No. 7,379,537, which is a continuation-in-part of U.S. patent application Ser. No. 09/532,038, now U.S. Pat. No. 6,778,643, filed Mar. 21, 2000, the disclosures of which are expressly incorporated herein by reference in their entireties.

TECHNICAL FIELD OF THE INVENTION

The present invention relates generally to interface designs, and more specifically relates to a system and method for automating the creation of customer-centric interfaces.

BACKGROUND OF THE INVENTION

Every year, company service centers typically receive numerous telephone calls from customers seeking assistance with particular tasks. The customers often speak with customer service representatives (CSR) to complete their tasks. Because of the cost associated with CSR time, companies are switching over to automated systems such as interactive voice response (IVR) systems where IVR systems answer the customer phone calls and direct the customer phone calls to the correct service center using one or more menus of options. The IVR systems allow customers to complete their tasks without the assistance of a CSR. In order to maintain a high level of customer satisfaction, an IVR system must be designed so that customers can easily navigate the various menus and accomplish their tasks without spending too much time on the telephone and becoming frustrated and unsatisfied with the company and its customer service. Many IVR systems are designed around how companies are organized which can make navigation of the IVR system difficult for the customers because although the customers know what task they want to accomplish, the customers typically do not know which departments within a company organization manage which tasks.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 1 depicts a block diagram of a system for the automated creation of a customer-centric interface;

FIG. 3 depicts an example task frequency table;

DETAILED DESCRIPTION OF THE INVENTION

Figure 2B:
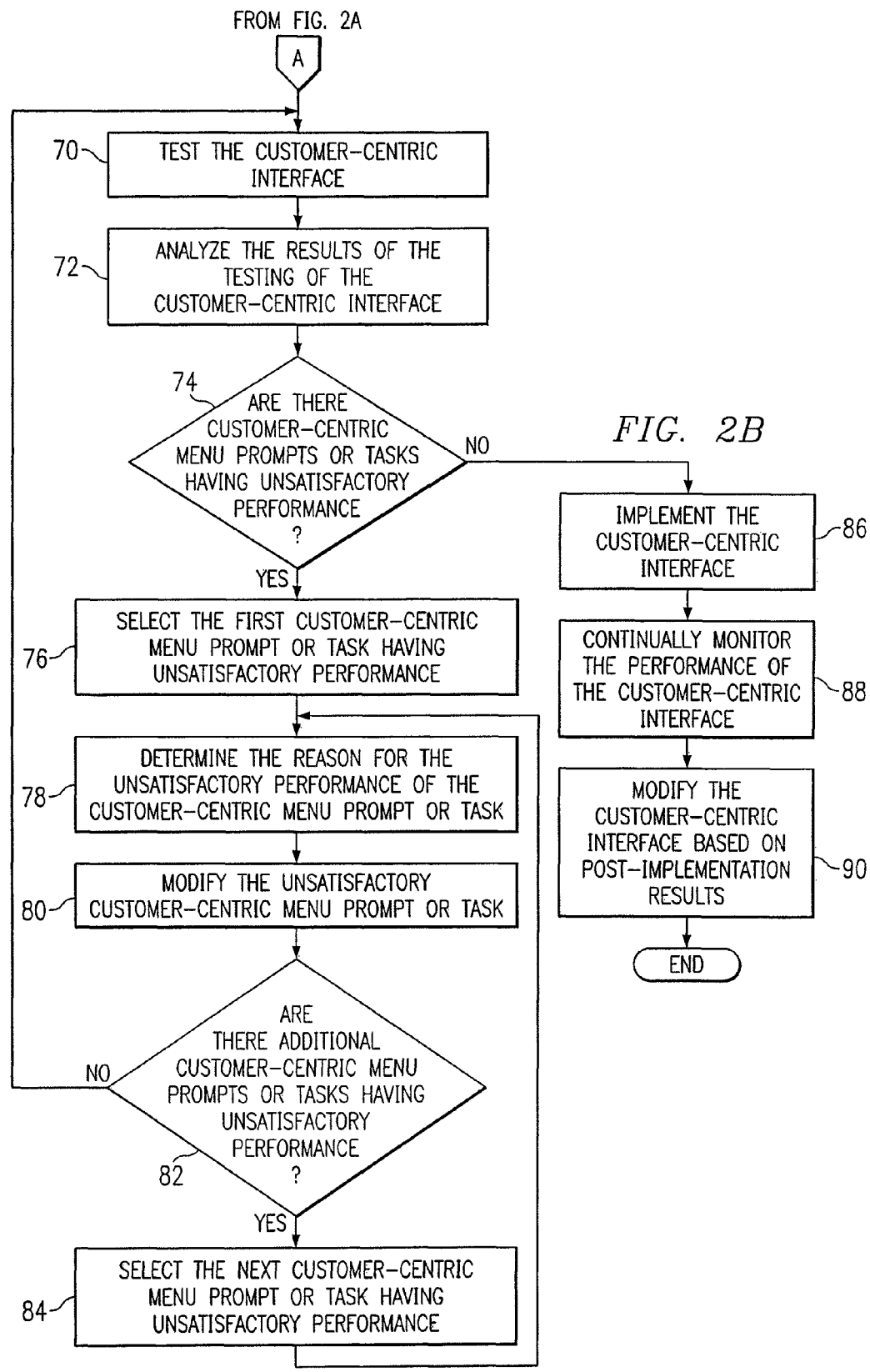
FIG. 2 depicts a flow diagram of a method for automating the creation of a customer-centric interface.

Preferred embodiments of the present invention are illustrated in the figures, like numerals being used to refer to like and corresponding parts of the various drawings.

Many companies that have customer service programs and/or call centers, such as telephone companies, Internet service providers, and credit card companies, typically have automated systems such as interactive voice response (IVR) systems that answer and direct customer phone calls when a customer calls seeking assistance for a particular task such as to change an address or inquire about payment of a bill. If a customer does not reach an IVR system when calling a service number, the customer may speak with a customer service representative (CSR) who either helps the customer or transfers the customer to an IVR. Within the IVR, the customer listens to one or more prerecorded menus or prompts and provides responses using either touch-tone input or speech input in order to accomplish their task. Therefore, the content and structure of the IVR including the prerecorded menus or prompts needs to allow for customers to easily and quickly accomplish their tasks with little frustration.

The typical approach to IVR system interface design involves a company design team creating a set of requirements where the design team is comprised of various individuals representing different departments within the company. The design team incorporates various perspectives and documents from the team members in designing the IVR interface. The design team decides how best to structure the interface based on their understanding of the underlying system and the organization of the company and the customers' preferences and level of knowledge are generally not taken into account.

Once designed, the IVR interface is tested to ensure functionality and that it is error free. The inclusion of customers into the design process occurs late in the development phase, if it all, through the usability testing. But much of the customer input gathered in the usability testing will not be implemented into the IVR interface because of the costs involved with making changes late in the development phase and only significant errors discovered through the usability testing are generally corrected. The result is an IVR interface having a business-centric organization and structure where the menu options and prompts are structured according to the organization of the company and are worded using company terminology.

When calling a customer service number, customers know why they are calling (to accomplish a specific task) but typically do not know which department within a company handles specific tasks. Therefore, business-centric interfaces generally do not allow for customers to easily and quickly navigate and accomplish their tasks with little frustration since business-centric interfaces are designed around a company's organization and way of thinking. When customers cannot quickly and easily accomplish their tasks, they generally make incorrect selections within the IVR interface resulting in misdirected calls. Misdirected calls are expensive to companies both in the time and money spent dealing with a misdirected call and in lower levels of customer satisfaction resulting from unpleasant customer experiences with business-centric interfaces which can lead to negative feelings towards the company.

By contrast, the example embodiment described herein allows for the automated creation of a customer-centric interface. The customer-centric interface is designed to best represent the customers' preferences and levels of knowledge and understanding. Additionally, the example embodiment allows for the inclusion of the customers in the design process from the beginning to ensure that the customer-centric interface is both usable and useful for the customers. The customer-centric interface allows for the customers to quickly and easily navigate the various menus within the customer-centric interface to accomplish their tasks with high levels of customer satisfaction. The customer-centric design also allows for increased call routing accuracy and a reduction in the number of misdirected calls. Therefore, companies save time and money because less time is spent dealing with misdirected calls and less resources are used by the customers since the customers spend less time within the customer-centric interface accomplishing their tasks.

Referring now to FIG. 1, a block diagram depicts customer-centric interface system 10 for automating the creation of customer-centric interfaces. In the example embodiment, customer-centric interface system 10 may include respective software components and hardware components, such as processor 12, memory 14, input/output ports 16, hard disk drive (HDD) 18 containing databases 20, 22, 24, 26, and 28 and those components may work together via bus 30 to provide the desired functionality. The various hardware and software components may also be referred to as processing resources. Customer-centric interface system 10 may be a personal computer, a server, or any other appropriate computing device. Customer-centric interface system 10 may further include a display and input devices such as a mouse and a keyboard. Customer-centric interface system 10 also includes collection engine 32, customer language engine 34, task frequency engine 36, customer structure engine 38, and customer performance engine 40, which reside in memory such as HDD 18 and are executable by processor 12 through bus 30. In alternate embodiments, HDD 18 may include more or less than five databases.

FIG. 2 depicts a flow diagram of a method for automating the creation of a customer-centric interface. The method begins at step 50 and at step 52 collection engine 32 collects a plurality of customer opening statements. When a customer calls a service number and speaks to a CSR, the customer typically tells the CSR the purpose of the call in the first substantive statement the customer makes. Alternatively, a customer may contact a company via the company web site or email and generally the first substantive statement made in the email or web site response includes the customer's purpose for contacting the company. These initial statements containing the purpose of the customer's call are often referred to as customer opening statements. Collection engine 32 collects the customer opening statements from customer service centers and stores the customer opening statement in customer opening statement database 20.

The customer opening statements provide insight into the tasks that the customers inquire about as well as the language or terminology the customers use to describe the tasks. At step 54, customer language engine 34 analyzes the customer opening statements to determine the language or terminology used by the customers when referring to particular tasks. When customers call a service number, they are not concerned with how the company is going to accomplish the task just that the task gets accomplished. Therefore, customer language engine 34 must learn and use the terminology of the customers in creating customer-centric menu prompts so that customers will be able to easily understand and identify how to accomplish their tasks when using the customer-centric interface.

At step 56, customer task model 150 within collection engine 32 determines the different reasons why the customers contact the company in order to create a list of tasks for which the customers access the customer-centric interface. Analysis of the customer opening statements allows for the determined tasks to be tested to see if the list of tasks accounts for a majority of the reasons why the customer contact the company. The tasks may include such tasks as "telephone line is not working," "question about my bill," "order a new service," or any other appropriate reason for a customer to call seeking assistance regarding a product or service.

Once the list of tasks has been created and determined to cover the majority of the customers' reasons for calling, task frequency engine 36 determines a task frequency of occurrence for each task at step 58. The task frequency of occurrence allows customer-centric interface system 10 to recognize which tasks customers are calling about the most and which tasks the customers are calling about the least. Task frequency engine 36 determines the task frequency of occurrence by examining and categorizing the customer opening statements. Each customer opening statement is examined to identify the purpose of the call and is then categorized as a particular task.

Once the customer opening statements have been categorized, task frequency engine 36 creates a task frequency table that ranks the tasks according to the task frequency of occurrence. The task frequency table details how often customers call with specific problems or questions about each particular task. An example task frequency table 100 for eighteen tasks 108-142 is shown in FIG. 3 and includes column 102 for the frequency rank of the task, column 104 for the task, and column 106 for the frequency value. In alternate embodiments, task frequency table 100 may include more or less than eighteen tasks. Task frequency table 100 shows that eighteen tasks account for more than 80% of the customer opening statements or service calls received from the customers. Task frequency table 100 allows for customer-centric interface system 10 to determine which tasks the customers call about the most and provides valuable information on how to arrange the customer-centric menu prompts within the customer-centric interface.

Task frequency table 100 is ordered in descending frequency order and is a statistically valid representation of the tasks that the customers inquire about when calling customer service centers. Because having a menu prompt for every single task results in numerous menu prompts making customer navigation of the customer-centric interface burdensome and slow, at step 60 task frequency engine 36 determines which tasks are to be included in the customer-centric interface. In order to allow easy and quick navigation for the customers but at the same time not utilize too many company resources operating the customer-centric interface, only the most frequently occurring tasks are included within the customer-centric interface.

Task frequency engine 36 utilizes task frequency table 100 to determine which tasks are to be included in the customer-centric interface. In one embodiment, task frequency engine 36 includes only the tasks that have a frequency of occurrence of 1% or higher Task frequency table 100 includes only the tasks having a frequency of occurrence of 1% or higher and includes eighteen tasks accounting for 80.20% of the tasks represented in the customer opening statement. In an alternate embodiment, task frequency engine 36 includes tasks so that the total number of included tasks accounts for a specified percentage coverage of the tasks represented in the customer opening statements. For instance, task frequency engine 36 may include a specified number of tasks so that the total frequency of occurrence is a specific total percentage coverage value such as 85%, 90% or any other appropriate percentage of coverage. Either embodiment typically allows for between fifteen and twenty tasks to be included in the customer-centric interface.

For efficient operation, the customer-centric interface does not include an opening customer-centric menu prompt listing all of the included tasks in frequency order. Such an opening menu prompt would take too long for the customers to listen to and would not allow for quick and easy navigation of the customer-centric interface. Therefore, the customer-centric interface is of a hierarchical design with the tasks grouped together by task relationships.

In order for the customer-centric interface to be organized from the vantage of the customers, the included tasks need to be grouped according to how the customers perceive the tasks to be related. Therefore at step 62, customer structure engine 38 elicits from one or more test customers each customer's perceptions as to how the included tasks relate to each other in order to create interface structure for the customer-centric interface. Interface structure is how the tasks are placed within the customer-centric interface and organized and grouped within the customer-centric menu prompts. For instance, the interface structure of a web page refers to how the pages, objects, menu items, and information is organized relative to each other while the interface structure for an IVR system refers to the sequence and grouping of the tasks within the customer-centric menu prompts. The interface structure for the customer-centric interface needs to allow for the customers to find information and complete tasks as quickly as possible without confusion.

Customer structure engine 38 uses tasks 108-142 from task frequency table 100 and performs customer exercises with the customers to elicit customer feedback regarding how the customers relate and group together tasks 108-142. For instance, customer structure engine 38 may require a group of test customers to group tasks 108-142 into one or more groups of related tasks. In addition, customer structure engine 38 may also require the test customers to make comparative judgments regarding the similarity of two or more of the tasks where the test customers state how related or unrelated they believe the tasks to be. Furthermore, customer structure engine 38 may require the test customers to rate the relatedness of the tasks on a scale. Customer structure engine 38 performs the customer exercises using a test IVR system, a web site, or any other appropriate testing means. In addition to eliciting tasks relationships, customer structure engine 38 also elicits from the test customers general names or headings that can be used to describe the groups of tasks in the customers own language or terminology.

Once customer structure engine 38 elicits from the test customers how the customers perceive tasks 108-142 to relate to each other, customer structure engine 38 aggregates the customer feedback and analyzes the customer feedback to determine customer perceived task relationships. The customer perceived task relationships are how the customers perceive the tasks to be related. Customer structure engine 38 represents the customer perceived task relationships in a numerical data matrix of relatedness scores that represents collectively the customers' perceived relatedness of the included tasks.

At step 64, customer structure engine 38 utilizes the customer perceived task relationships and the numerical data matrix and combines the included tasks into one or more groups of related tasks. For example, using the customer feedback from the customer exercises, customer structure engine 38 determines that the customers perceive tasks 114, 136, and 140 as related and group one, tasks 128, 130, and 138 as related and group two, tasks 108, 110, 112, 116, 120, 122, 124, 126, 134, and 142 as related and group three, and tasks 118 and 132 as related and group four. To aid in the grouping of the tasks and to better enable the company to understand the structure and grouping of the tasks, customer structure engine 38 represents the customer perceived task relationships and numerical data matrix in a graphical form. For instance, customer structure engine 38 may generate a flow chart or indogram illustrating a customer-centric call flow for the groups of tasks.

At step 66, task frequency engine 36 orders the groups of task and the tasks within each group based on the task frequency of occurrence. Task frequency engine 36 determines a frequency of occurrence for each group of tasks by summing the individual frequency of occurrences for each task within each group. From the example above, group one has a group frequency of occurrence of 8.9% (6.7%+1.1%+1.1%), group two has a group frequency of occurrence of 6.2% (3%+2.1%+1.1%), group three has a group frequency of occurrence of 59.4% (14%+11.6%+11.3%+5.6%+3.8%+3.8%+3.5%+3.4%+1.4%+1.0%), and group four has group frequency of occurrence of 5.7% (3.8%+1.9%). Task frequency engine 36 orders the groups within customer-centric interface in descending frequency order so that the tasks having the highest frequency of occurrence are heard first by the customers when the customers listen to the customer-centric menu prompts within the customer-centric interface. Since 59.4% of the customer will be calling about a task in group three, task frequency engine 36 orders group three first followed by group one, group two, and group four.

In addition to ordering the groups of tasks, task frequency engine 36 also orders the tasks within each group. Task frequency engine 36 orders the tasks within each group according to each task's frequency of occurrence from the highest frequency of occurrence to the lowest frequency of occurrence. For instance, the tasks in group one are ordered as task 114, task 136, and task 140. The tasks in group two are ordered as task 128, task 130, and task 138. The tasks in group three are ordered as task 108, task 110, task 112, task 116, task 120, task 122, task 124, task 126, task 134, and task 142. The tasks in group four are ordered as task 118 and task 132. The grouping and ordering of the tasks allow for the high frequency tasks to be more accessible to the customers than the low frequency tasks by placing the tasks having higher frequency of occurrences higher or earlier in the customer-centric interface menu prompts.

At step 68, customer language engine 34, task frequency engine 36, and customer structure engine 38 work together to create and order the customer-centric menu prompts for the customer-centric interface. Task frequency engine 36 and customer structure engine 38 do not take into account customer terminology when calculating task frequencies, grouping the tasks, and ordering the tasks. So once task frequency engine 36 and customer structure engine 38 create interface structure including ordering the included tasks, customer language engine 34 creates customer-centric menu prompts using the customers own terminology. Customer-centric menu prompts in the language of the customers allow for the customers to more easily recognize what each menu prompt is asking and allows the customer to accomplish their tasks quickly and with little frustration. In alternate embodiments, customer language engine 34 may create customer-centric menu prompts using action specific object words in addition to the customers own terminology. The use of action specific object words to create menu prompts is described in further detail below with respect to FIG. 5.

Once customer-centric interface system 10 creates the customer-centric menu prompts and the customer-centric interface, customer performance engine 40 tests the customer-centric interface at step 70 by performing usability tests. Customer performance engine 40 performs the usability tests in order to locate and fix any problems with the customer-centric interface before the customer-centric interface is implemented for use by all customers. The usability tests involve laboratory tests where test customers are asked to accomplish sets of tasks using the customer-centric interface such as "Call Telephone Company at 555-1111 and change your billing address." In these tests, the test customers use telephones to interact with the customer-centric interface. The customer-centric interface plays the prerecorded customer-centric menu prompts to the test customers and customer performance engine 40 records information regarding the test customers' responses such as the menu name for the menus accessed, the amount of time the prerecorded menu prompt played before the test customer made a selection or pressed a key, and the key that the test customer pressed.

When the usability tests conclude, at step 72 customer performance engine 40 analyzes the results of the usability tests. With respect to the results, customer performance engine 40 focuses on three different usability test results: customer satisfaction, task accomplishment, and response times. Customer satisfaction is whether or not the test customer was satisfied using the customer-centric interface. Customer performance engine 40 gathers customer satisfaction by asking the test customers a variety of questions regarding their experiences in interacting with the customer-centric interface such as how satisfied the test customer was in accomplishing the assigned tasks, how confident the test customer was about being correctly routed, the level of agreement between the selected menu prompts and test customers' assigned tasks, and whether the test customers would want to user the customer-centric interface again.

Customer performance engine 40 also determines a task accomplishment or call routing accuracy score. Task accomplishment measures whether a test customer successfully completes an assigned task and is based on a sequence of key presses necessary to navigate the customer-centric interface and accomplish the task. Customer performance engine 40 determines if the test customers actually accomplished their assigned task. For example, if a test customer was assigned the task of using the customer-centric interface to inquire about their bill, did the test customer correctly navigate the customer-centric menu prompts in order to inquire about their bill. Customer performance engine 40 examines all the different menu prompts accessed by the test customers and compares the test customer key sequences with the correct key sequences in order to determine if the test customers accomplished the assigned tasks.

In addition to customer satisfaction and task accomplishment, customer performance engine 40 also calculates a response time or cumulative response time (CRT) for each customer-centric menu prompt accessed by the test customers. The response time indicates the amount of time a test customer spends interacting with each customer-centric menu prompt and the customer-centric interface. The response times reflects the amount of time the test customers listen to a menu prompt versus the amount of time it takes for the menu prompt to play in its entirety. The amount of time the test customers spend listening to the menu prompt is not a very valuable number unless menu duration times are also taken into account. A menu duration time is the amount of time it takes for a menu prompt to play in its entirety. For instance, a menu prompt may have five different options to choose from and the menu duration time is the amount of time it takes for the menu prompt to play through all five options.

Customer performance engine 40 records a listening time for each test customer for each menu prompt. The listening time is the time the test customers actually spend listening to a menu prompt before making a selection. Customer performance engine 40 also has access to the menu duration times for all of the customer-centric menu prompts in the customer-centric interface. Customer performance engine 40 calculates a response for a menu prompt which is the difference between the listening time and the menu duration time by subtracting the menu duration time from the listening time.

For example, if the introductory menu prompt of the customer-centric interface requires 20 seconds to play in its entirety (menu duration time) and the test customer listens to the whole menu and then makes a selection, the test customer has a listening time of 20 seconds and receives a CRT score or response time of 0 (20−20=0). If the test customer only listens to part of the menu prompt, hears their choice and chooses an option before the whole menu plays, then the test customer receives a negative CRT score or response time. For instance, if the test customer chooses option three 15 seconds (listening time) into the four-option, 20 second menu prompt, the test customer receives a CRT score or response time of "−5" (15−20=−5). Conversely, the test customer has a response time of +15 if the test customer repeats the menu prompt after hearing it once, and then choose option three 15 seconds (35 second listening time) into the second playing of the menu (35−20=15).

A negative response time is good because the test customer spent less time in the customer-centric interface than they could have and a positive response time is bad because the test customer spent more time than they should have in the customer-centric interface. In addition to calculating response times for individual menu prompts, customer performance engine 40 may also calculate response times for entire tasks and each test customer by summing the menu duration times and the listening times for each menu prompt required to accomplish the task and subtracting the total menu duration time from the total listening time.

Once customer performance engine 40 has determined customer satisfaction, task accomplishment, and response times, customer performance engine 40 generates a performance matrix which charts customer satisfaction, task accomplishment, and response times for each test customer, each customer-centric menu prompt, and each task. The performance matrix allows for customer performance engine 40 to determine if any of the customer-centric menu prompts or tasks have unsatisfactory performance at step 74 by examining the combination of customer satisfaction, task accomplishment, and response times and thereby evaluating how well the customer-centric interface performs. Ideally a customer-centric menu prompt and task have a high level of customer satisfaction, a negative or zero response time, and a high rate of task accomplishment. For unsatisfactory performance, customer performance engine 40 looks for low customer satisfaction, low task completion, or a high positive response time. By charting the customer satisfaction, task accomplishment, and response times on the performance matrix, customer performance engine 40 can determine when one of the test results is not satisfactory.

If a customer-centric menu prompt or task has unsatisfactory performance at step 74, then at step 76 customer performance engine 40 selects the menu prompt or task, at step 78 determines the reason for the unsatisfactory performance, and at step 80 modifies the customer-centric menu prompt or task to correct for the unsatisfactory performance. For example, a task may have a high level of customer satisfaction and high rate of task accomplishment but a positive response time. The test customers are accomplishing the task and are satisfied when interacting with the customer-centric interface but are spending too much time interacting with the customer-centric interface as indicated by the positive response time. The positive response time is not good for the customer-centric interface because the customers are using unnecessary resources from the customer-centric interface in the form of too much time in accomplishing the task. By examining the menu prompts for the task, customer performance engine 40 determines that the terminology used in the menu prompts for the task is not the terminology used by the customers. Therefore, customer performance engine 40 alerts customer language engine 34 to the terminology problem and customer language engine 34 rewords the menu prompts for the task using the customers own terminology.

Once customer performance engine 40 locates and corrects the problem, customer performance engine 40 determines if there are additional menu prompts or tasks that have unsatisfactory performance at step 82. If at step 82 there are additional menu prompts or tasks having unsatisfactory performance, then at step 84 customer performance engine 40 selects the next menu prompt or task having unsatisfactory performance and returns to step 78. Customer performance engine 40 repeats steps 78, 80, 82, and 84 until there are no additional menu prompts or tasks at step 82 having unsatisfactory performance. When there are no additional menu prompts or tasks having unsatisfactory performance at step 82, the process returns to step 70 and customer performance engine 40 tests the customer-centric interface having the modified menu prompts or tasks. Customer performance engine 40 repeats steps 70, 72, 74, 76, 78, 80, 82, and 84 until there are no customer-centric menu prompts or tasks having unsatisfactory performance at step 74.

When there are no customer-centric menu prompts or tasks having unsatisfactory performance at step 74, at step 86 customer-centric interface system 10 implements the customer-centric interface for use by the customers. As customers use the customer-centric interface, customer-centric interface system 10 and customer performance engine 40 continually monitor the performance of the customer-centric interface checking for low customer satisfaction levels, low task completion rates, or high positive response times at step 88. When customer-centric interface system 10 discovers an unsatisfactory post-implementation result such as those described above, customer-centric interface system 10 determines the cause of the problem and modifies the customer-centric interface to correct the problem. As long as the customer-centric interface is accessible by the customers, customer-centric interface system 10 monitors the customer-centric interface performance and modifies the customer-centric interface to allow for customer-centric menu prompts that are worded in the terminology of the customers, that directly match the tasks that the customers are trying to accomplish, and that are ordered and grouped by customer task frequencies and the customers' perceptions of task relationships.

Figure 4:
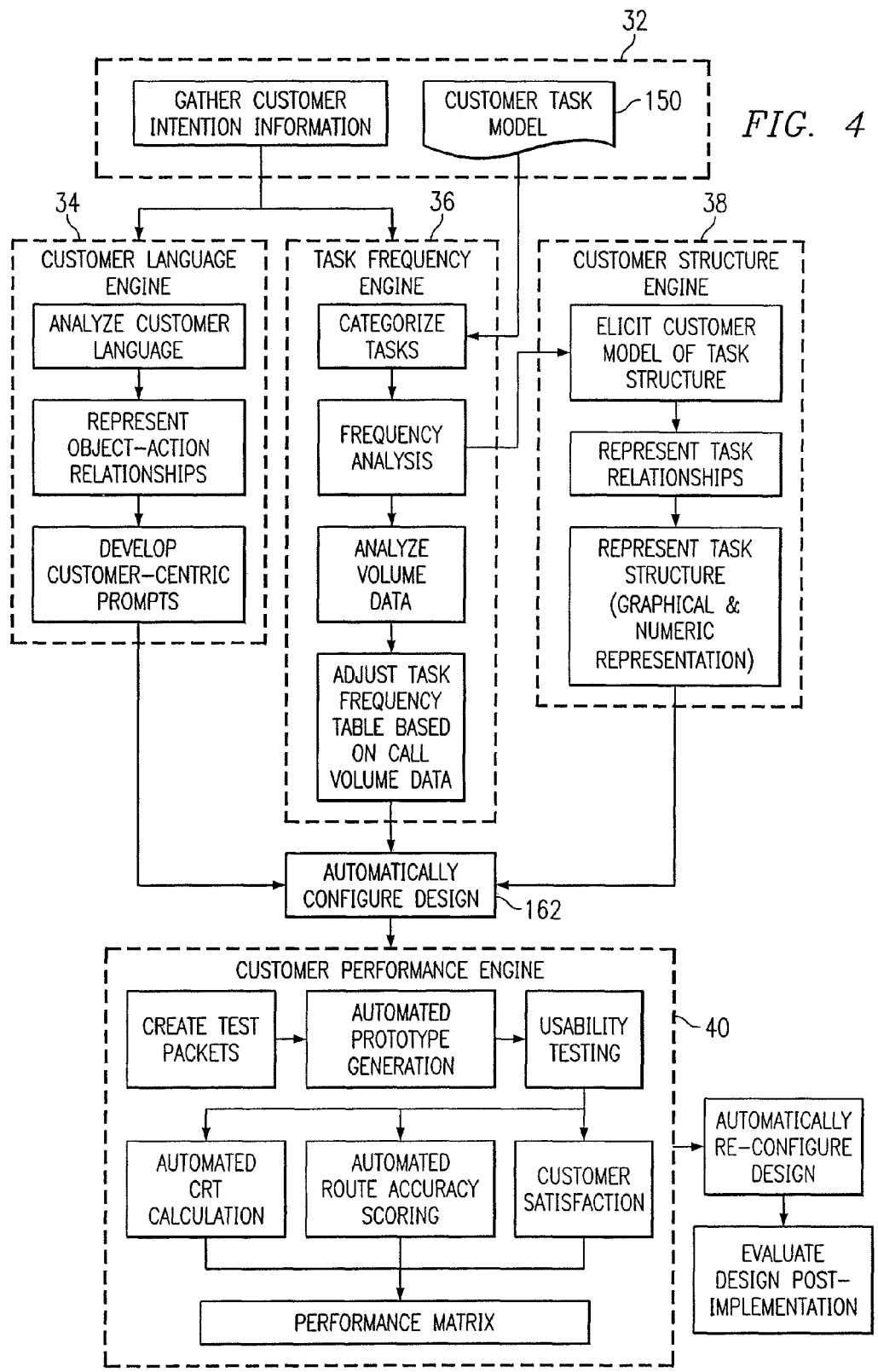
FIG. 4 illustrates a block flow diagram of various components of the system for automated creation of a customer-centric interface.

FIG. 4 illustrates a block flow diagram of how collection engine 32, customer language engine 34, task frequency engine 36, customer structure engine 38, and customer performance engine 40 of customer-centric interface system 10 interact and interoperate to automatically create the customer-centric interface. In addition, FIG. 4 also represents the various functions for collection engine 32, customer language engine 34, task frequency engine 36, customer structure engine 38, and customer performance engine 40.

Collection engine 32 gathers customer intention information from the customer opening statements and includes customer task model 150 which includes the list of tasks for which the customers access and use the customer-centric interface. Customer language engine 34, task frequency engine 36, and customer structure engine 38 perform their various functions by processing and manipulating the customer intention information and task list.

Customer language engine 34 develops customer-centric menu prompts for the customer-centric interface using the customers own terminology. Customer language engine 34 analyzes-the customers' language by analyzing and tracking every word used by the customers in the customer opening statements to get a feel for how the customers refer to each of the tasks. Customer language engine 34 counts each word in each customer opening statement to determine which words the customers use the most and thereby recognize which of the customers' words are best to use in creating customer-centric menu prompts using the customers own terminology.

In addition to creating customer-centric menu prompts using the customers own terminology, in alternate embodiments of customer-centric interface system 10 customer language engine 34 may also create customer-centric menu prompts using action specific object words taken from the customer opening statements.

Figure 5:
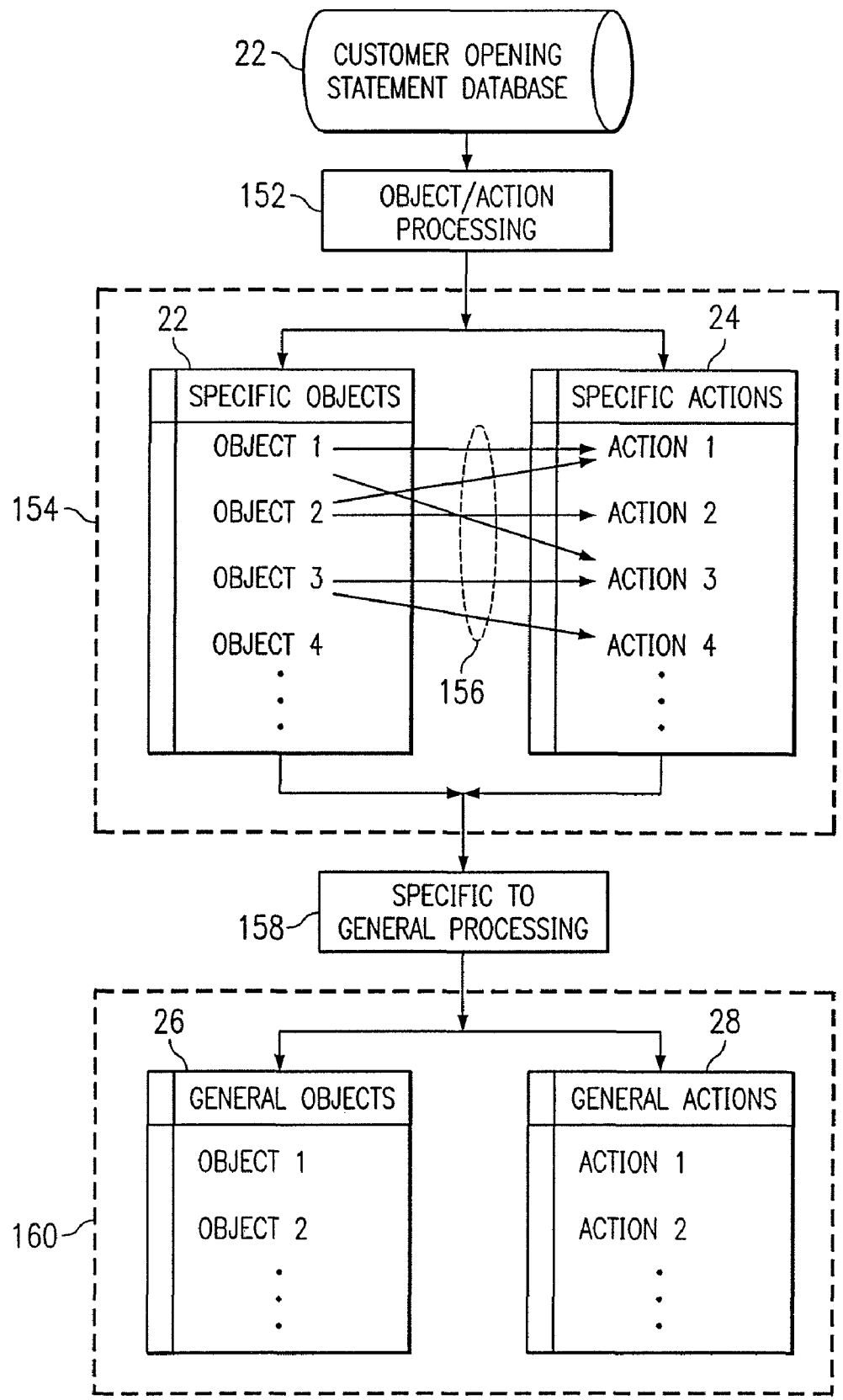
FIG. 5 illustrates a flow diagram of a method for creating customer-centric menu prompts.

FIG. 5 illustrates a flow diagram for creating customer-centric menu prompts utilizing action specific object words. Customer wordings of tasks in customer opening statements are generally in four different styles: action-object ("I need to order CALLNOTES"), action ("I need to make changes"), object ("I don't understand my bill"), and general ("I have some questions"). Menu prompts are typically worded in one of four styles: action specific object ("To order CALLNOTES press one"), specific object ("For CALLNOTES press two"), general object ("To order a service press three"), and action general object ("For all other questions press four").

The style of the menu prompt wording can have an effect on the performance of the menu prompt due to the customers interaction with the menu prompt. Wording menu prompts as action specific object is typically the best way to word customer-centric menu prompts because upon hearing a an action specific object menu prompt, the customer generally knows that it is the menu prompt they want to select and therefore response times decrease because customers do not have to repeat the menu prompts in order to make a selection. For example, if a customer calls wanting to order CALLNOTES and the second option in the six option menu prompt is "To order CALLNOTES press two" then the customer will typically press two without listening to the rest of the menu prompts and therefore have a negative response time, high customer satisfaction, and high task accomplishment rate.

In order to create customer-centric menu prompts using action specific object words, customer language engine 34 determines the action words and object words used by the customers. At step 152, customer language engine 34 analyzes the customer opening statements in customer opening statement database 20 in order to identify the action words and the object words used by the customers in their opening statements. In addition to identifying the action words and the object words, customer language engine 34 also determines which of the action words are specific action words and which of the object words are specific object words. For instance, "order" and "pay" are specific action words and "CALLNOTES" and "Call Waiting" are specific object words while "service" and "question" are not specific object words.

At step 154, customer language engine 34 saves the specific action words in specific action database 22 and the specific object words in specific object database 24. When saving the specific action words and the specific object words, customer language engine 34 identifies and maintains the relationships between the specific action words and the specific object words by linking the specific action words with the specific object words that were used together by the customers as shown by arrows 156 in FIG. 5. For example, for the customer opening statements of "I want to buy CALLNOTES" and "I want to inquire about my bill," "buy" and "inquire" are the specific action words and "CALLNOTES" and "bill" are the specific object words. When customer language engine 34 saves the respective specific action words and specific object words in databases 22 and 24, a link will be maintained between "buy" and "CALLNOTES" and between "inquire" and "bill." Maintaining how the customers use the action words and object words in databases 22 and 24 prevents erroneous combinations of specific action words and specific object words when creating customer-centric menu prompts. An example erroneously combined menu prompt is "To buy a bill press one" since the statement would not make sense to the customer. The linking of the specific action words with the specific object words which the customer used together allows for the formation of correct customer-centric menu prompts that make sense to the customers.

In addition to storing the specific action words and the specific object words in databases 22 and 24, customer language engine 34 also calculates a frequency of occurrence for each specific action word and each specific object word and stores the specific action words and the specific object words in databases 22 and 24 in accordance with the frequency of occurrence in descending frequency order. Therefore, the specific action words having the highest frequency of occurrence are stored at the top of specific action database 22 and the specific object words having the highest frequency of occurrence are stored at the top of specific object database 24.

Once customer language engine 34 determines the frequency of occurrence and stores the specific action words and the specific object words, at step 158 customer language engine 34 generalizes the specific action words into general groups of specific action words and generalizes the specific object words into general groups of specific object words. Customer language engine 34 examines the specific action words and the specific object words for commonalties and then groups the specific action words and the specific object words together in groups based on the commonalties. For example, the specific action words of "buy," "order," and "purchase" all share the commonality of acquiring something and may be grouped together. The specific object words of "CALLNOTES" and "Call Waiting" share the commonality of being residential telephone services and therefore may be grouped together. Customer language engine 34 assigns names for each of the general groups of specific action words and the specific object words and saves the general action words in general action database 26 and the general object words in general object database 28 at step 160.

Having specific action database 22, specific object database 24, general action database 26, and general object database 28 allows for a great resource for customer language engine 34 to locate customer terminology when creating customer-centric menu prompts. For creating upper level hierarchical menu prompts, customer language engine 34 uses words from general action database 26 and general object database 28. To create action specific object menu prompts in the words of the customers for lower level hierarchical menu prompts, customer language engine 34 uses words from specific action database 22 and specific object database 24. Because the specific action words and the specific object words are ordered by frequency in databases 22 and 24, customer language engine 34 can create action specific object menu prompts using the customer terminology most often used by the customers.

While customer language engine 34 determines the customer terminology and wording to use for the customer-centric menu prompts, task frequency engine 36 determines the frequency of occurrence for the tasks that the customers call about and also determines which tasks will be included in the customer-centric interface. Generally the customer opening statements are from more than one call center so when determining the frequency of occurrence for each task, task frequency engine 36 takes into account the volume of calls into each call center when constructing the task frequency table so that the frequency results are accurate. Frequency of occurrence data must be weighted so that a call center receiving three million calls does not have the same weight as a call center receiving ten million calls.

Once task frequency engine 36 determines the tasks to be included in the customer-centric interface including all tasks down to 1% frequency or to a percentage coverage, customer structure engine 38 elicits customer perceived task relationships for the included tasks as described above. Utilizing the customer perceived task relationships, customer structure engine 38 creates interface structure for the customer-centric interface and represents the interface structure both as a numerical data matrix and a graphical representation.

At box 162, customer language engine 34, task frequency engine 36, and customer structure engine 38 work together to automatically create the customer-centric interface. Customer language engine 34 contributes the wording of the customer-centric menu prompts in the customers own terminology for the customer-centric interface. Task frequency engine 36 provides the tasks that are to be included in the customer-centric interface, the ordering of the groups of tasks in the menu prompts, and the ordering of the tasks within the groups of tasks. Customer structure engine 38 provides the interface structure or grouping of tasks for the customer-centric interface. After the automated creation of the customer-centric interface, customer performance engine 40 performs usability tests on the customer-centric interface as described above and evaluates and reconfigures the customer-centric interface based on customer satisfaction, task accomplishment, and response times during both the testing phase and implementation.

Customer-centric interface system 10 allows for the automated creation of a customer-centric interface that directly matches menu prompts with customer tasks, orders and groups the tasks and menu options by the task frequency of occurrence and the customer perceived task relationships, and states the menu prompts using the customers own terminology. Although the present invention has been described in detail with respect to an IVR system, customer-centric interface system 10 may also be utilized for the automated creation of customer-centric interfaces for web sites with respect to developing content for the web site, designs of the web pages, and what tasks to locate on different web pages.

Although the present invention has been described in detail, it should be understood that various changes, substitutions and alterations can be made hereto without the parting from the spirit and scope of the invention as defined by the appended claims.

What is claimed is:

1. A method for providing a plurality of prompts, comprising:

creating the plurality of prompts for an interface to at least one hardware component, each of the plurality of prompts representing tasks to be accomplished by a user, and each of the plurality of prompts being obtained based on user input and a grouping of the tasks according to a determination of comparative similarity obtained from the user input, among the tasks; and modifying the interface based on user feedback obtained from test users interacting with the plurality of prompts, wherein wording for each of the plurality of prompts is designated using a phrase created by the test users providing the user input using the test users' own words.

2. The method according to claim 1,
wherein the interface is graphically represented.

3. The method according to claim 1,
wherein the interface comprises an interactive voice system.

4. The method according to claim 1,
wherein the interface determines a structure of a website.

5. The method according to claim 1, further comprising:
developing content for a website based on the interface.

6. The method according to claim 1, further comprising:
ordering the plurality of prompts according to frequencies of occurrence for tasks corresponding to each of the plurality of prompts.

7. A system implemented on at least one processor for providing a plurality of prompts, comprising:
a customer language engine executable by the at least one processor to receive user input and to create the plurality of prompts for an interface to at least one hardware component, each of the plurality of prompts representing tasks to be accomplished by a user, and each of the plurality of prompts being obtained based on the user input and a grouping of the tasks according to a determination of comparative similarity obtained from the user input, among the tasks; and
a customer performance engine executable by the at least one processor that modifies the interface based on user feedback obtained from test users interacting with the plurality of prompts,
wherein wording for each of the plurality of prompts is designated using a phrase created by the test users providing the user input using the test users' own words.

8. The system according to claim 7,
wherein the tasks comprise action data that describes an action the user would like to perform with respect to an object.

9. The system according to claim 8,
wherein the tasks further comprise object data that describes the object upon which the action is performed.

10. The system according to claim 9,
wherein the object data comprises user-specific data stored by the system.

11. The system according to claim 8,
wherein the action data comprises data relating to at least one of accessing and interacting with the object.

12. The system according to claim 9,
wherein the customer language engine is executable by the at least one processor to create a system-generated task by combining object data obtained from a first task with action data obtained from a second task.

13. The system according to claim 7,
wherein the user input is not based on predetermined input.

14. The system according to claim 7,
wherein the user input is obtained from at least one of a telephone call, an electronic mail, and a submission via a website.

15. The system according to claim 7,
wherein the user feedback is obtained by monitoring the user interacting with the plurality of prompts for the interface.

16. A non-transitory computer readable medium storing a computer program, recorded on the computer readable medium, for providing a plurality of prompts, the medium comprising:
a customer language code segment, recorded on the computer readable medium, executable to create the plurality of prompts for an interface to at least one hardware component, each of the plurality of prompts representing tasks to be accomplished by a user, and each of the plurality of prompts being obtained based on user input and a grouping of the tasks according to a determination of comparative similarity obtained from the user input, among the tasks; and
a customer performance code segment, recorded on the computer readable medium, executable to modify the interface based on user feedback obtained from test users interacting with the plurality of prompts,
wherein wording for each of the plurality of prompts is designated using a phrase created by the test users providing the user input using the test users' own words.

17. The non-transitory computer readable medium according to claim 16, further comprising:
a task frequency code segment, recorded on the computer readable medium, executable to determine a frequency of occurrence for each of the tasks, and
wherein the customer language code segment creates the plurality of prompts, based on the frequency of occurrence for each of the tasks, using the using the user terminology.

18. The non-transitory computer readable medium according to claim 16,
wherein modifying the interface comprises modifying the plurality of prompts based on an accuracy score for accomplishing a specified task using the interface.

19. The non-transitory computer readable medium according to claim 18,
wherein the customer performance code segment modifies the interface based on response times for accomplishing the specified task using the interface.

20. The non-transitory computer readable medium according to claim 16,
wherein the at least one hardware component comprises a computing device.

* * * * *